United States Patent [19]

Karydas

[11] Patent Number: 4,921,619
[45] Date of Patent: * May 1, 1990

[54] ENHANCED OIL RECOVERY THROUGH CYCLIC INJECTION OF FLUOROCHEMICALS

[75] Inventor: Athanasios Karydas, Brooklyn, N.Y.

[73] Assignee: Ciba-Geigy Corporation, Ardsley, N.Y.

[ * ] Notice: The portion of the term of this patent subsequent to Aug. 30, 2005 has been disclaimed.

[21] Appl. No.: 180,412

[22] Filed: Apr. 12, 1988

[51] Int. Cl.$^5$ ............................................. E21B 43/22
[52] U.S. Cl. .............................. 252/8.554; 252/8.551; 252/8.552; 166/303; 166/305.1
[58] Field of Search ............... 252/8.551, 8.552, 8.554; 166/303, 305.1

[56] References Cited

U.S. PATENT DOCUMENTS

| | | | |
|---|---|---|---|
| 4,018,689 | 4/1977 | Thompson | 252/8.553 |
| 4,028,257 | 6/1977 | Thompson | 252/8.554 |
| 4,108,782 | 8/1978 | Thompson | 252/8.551 |
| 4,425,242 | 1/1984 | Penny et al. | 252/8.551 |
| 4,432,882 | 2/1984 | Raynolds et al. | 252/8.551 |
| 4,440,653 | 4/1984 | Briscoe et al. | 252/8.551 |
| 4,460,791 | 7/1984 | Cooke | 568/45 |
| 4,536,304 | 8/1985 | Borchardt | 252/8.551 |
| 4,557,837 | 12/1985 | Clark, III et al. | 252/8.553 |
| 4,565,639 | 1/1986 | Penny et al. | 252/8.552 |
| 4,585,065 | 4/1986 | Penny et al. | 252/8.552 |
| 4,594,200 | 6/1986 | Penny | 260/512 R |
| 4,775,489 | 10/1988 | Watkins et al. | 252/8.552 |

FOREIGN PATENT DOCUMENTS 658725  3/1963  Canada .

OTHER PUBLICATIONS

Chem. Abst. 105, 175678r.
Derwent 84-238815/39.

Primary Examiner—John F. Terapane
Assistant Examiner—Gary L. Geist
Attorney, Agent, or Firm—Luther A. R. Hall; JoAnn Villamizar; Irving M. Fishman

[57] ABSTRACT

An oil recovery process comprising contacting an oil deposit with a blend of chemicals containing a fluorochemical of the formula $$[(R_f)_n(R')_p]_m Z \qquad (I)$$

wherein each $R_f$ is independently a perfluoroaliphatic or omega-hydroperfluoroaliphatic group each of which is optionally interrupted by carbonyl, carboxy, carbonylamino, oxygen, sulfur, sulfinyl, or sulfonyl; n is 1–3 and p is 0 or 1 provided what when p is 0, n is 1; m is 1–5000; each $R'$ is independently an organic linking group between $R_f$ and Z having a valency of n+1; and Z is a hydrocarbyl containing residue of valency m.

31 Claims, No Drawings

ENHANCED OIL RECOVERY THROUGH CYCLIC INJECTION OF FLUOROCHEMICALS

BACKGROUND OF THE INVENTION

Viscosity frequently limits the rate crude oil can be produced from a well. For example, in wells that are pumped by a sucker rod string, viscous drag by the crude oil on the string slows its free fall by gravity on the downstroke. On the upstroke, this drag also slows the string, decreases oil flow through the production tubing, and increases the power required to raise oil and rod string. In some instances where the oil is highly viscous, such as the Boscan field in Venezuela, the strength of the sucker rods limits the depth at which the pump can be operated. Alternatively, hydraulic pumps can be placed at the bottom of the well, but they must still overcome the high viscous drag that requires high power oil pressures and high pump horsepower.

The downhole pump usually provides the pressure required to pump the produced oil from the wellhead to surface gathering tanks. Where viscosity is high, this may require the use of extra strength wellhead equipment (packings, gaskets, heavy walled pipes and the like) to withstand the pressures required to move such viscous oil from wellhead to storage tank.

It has been proposed heretofore to reduce the viscosity of heavy crude oils prior to pumping by introducing low viscosity crude oils, white oil, kerosene or the like into the well bore to dilute or thin the produced crude. In rod pumped wells, it is common to surround the sucker rod string with an extra tubing. Low viscosity oil is pumped down this tubing so that the string is surrounded by lower viscosity oil. This added light oil then mixes with the viscous crude near the traveling valve of the pump to lighten and thin the column of crude oil being pumped from the well through the annulus formed by the inner and the production tubings of the well. Alternatively, low viscosity oil can be pumped down hollow sucker rods and the diluted crude oil produced through the annulus between the hollow rod string and the tubing.

The resulting produced crude has reduced viscosity and is more economically transported; however, these low viscosity diluents are expensive and not always available and have to be reclaimed from the diluted crude.

Another method of reducing the viscosity of the produced heavy crude is by thermal methods, that is, producing them at elevated temperatures. Thermal recovery pertains to oil recovery processes in which heat plays a principal role. The most widely used thermal techniques are in situ combustion (fireflooding), continuous injection of hot fluids such as steam, water, or gas and cyclic operations such as steam soaking. Because of the strong temperature dependence of oil viscosity, these thermal methods find greatest application in the recovery of extremely viscous, low API gravity crudes, for which the usual displacement method such as waterflooding are unfruitful.

Cyclic steam injection (also called huff and puff steam stimulation) is the most commonly applied thermal recovery process. Steam is injected directed into the reservoir through the production wells to heat the surrounding area. The condensation and cooling of the steam heats the reservoir rock and oil, reducing the oil viscosity and thus increasing production rates. After two or three weeks, the steam injection is stopped and the heated oil is produced from these same wells. After the hot oil production has ended, a new cycle may be initiated. The time period of the cycles is on the order of six to twelve weeks or longer. These reservoirs are usually shallow and producing wells are drilled on very close spacing because the heat does not penetrate far from the wells.

The value of the process lies not so much in improving the ultimate recovery as in increasing the producing rate and yielding a response that is almost immediate upon cessation of steam injection. The primary benefits of the process are the reduction of oil viscosity near the well and the cleaning of the well bore.

Steam drive (also referred to as steam flooding or steam displacement) involves the injection of steam into a group of outlying wells to push oil toward the production wells. In this process the heat is pushed into the perimeters of the reservoir to displace oil and reduce viscosity. To ensure high rates of production at the wellhead, steam flooding projects are typically conducted jointly with cyclic steam injection in the production wells.

The steam-saturated zone, in the reservoir whose temperature is approximately that of the injected steam, moves oil to the production well by steam distillation of the oil, solvent extraction, and a gas drive. As the steam cools and condenses, a zone of hot water is formed which floods the formation. Oil recovery efficiency ranges from 35 to 50% of the reservoir oil in place, depending on oil and reservoir characteristics.

Although the above processes enhance oil production, they are not cost effective on marginal or "stripper" wells.

FIELD OF INVENTION

The invention relates to recovery of oil from underground deposits using cyclic chemical injection into the producing well. The invention further relates to the area of fluorochemicals, in particular those having one or more perfluoro groups.

A number of fluorochemicals have been used in oil recovery processes for a variety of reasons. For example U.S. Pat. No. 4,018,689 describes the use of (perfluorooctylsulfonamido propyl)(trimethyl) ammonium iodide to reduce the surface tension of aqueous fluids used in oil recovery. Canadian Patent 1,207,517, corresponding to U.S. patent application Ser. No. 419,294, filed September 17, 1982, discusses perfluorinated quaternary ammonium iodides in waterflooding oil recovery processes. U.S. Pat. No. 4,565,639 discloses the use of perfluoroalkylpolyoxyalkylene compounds to increase petroleum and gas production from water block reservoirs.

U.S. Pat. No. 4,536,304 discloses the use of perfluoroalkyl polyoxyalkylene ammonium compounds to reduce migration of fines in an oil recovery process. Quaternized perfluoropolyoxyalkylenes are also described as biocide enhancers in polymer flooding oil recovery processes in European application 119,704, corresponding to U.S. application Ser. No. 476,003, filed March 17, 1983.

In German Offenlegungsschrift DE 3,306,593, corresponding to U.S. application Ser. No. 355,990, perfluoralkyl polyoxyalkylenes and their esters are taught as suitable foaming compounds for use in oil recovery. German Offenlegungsschrift DE 2,922,928, corresponding to U.S. application Ser. No. 944,820, filed September 22, 1978 discloses perfluoroalkyl containing compounds suitable for water-flooding oil recovery.

Additional fluorochemical compounds are mentioned in U.S. Pat. Nos. 4,425,242, 4,432,882, 4,460,791, and 4,594,200 in connection with oil recovery processes. However, each of these mentions compounds in processes which are distinct from the cyclic chemical injection systems.

OBJECTS OF THE INVENTION

An object of the invention is to provide a method for substantially increasing the total yield of oil obtainable from oil containing deposits.

A further object of the invention is to provide a method by which previously economically non-recoverable oil deposit reserves can be economically harvested.

A third object of the invention is to provide a method of oil recovery suitable for a wide variety of oil deposit types.

SUMMARY OF THE INVENTION

The invention is an oil recovery process wherein a fluorochemical of the formula

$$[(R_f)_n-(R')_p]_m Z \qquad (I)$$

is introduced into an oil bearing formation, and the oil released therefrom is recovered.

DETAIL DESCRIPTION OF THE INVENTION

The invention is an oil recovery process which does not require heat induction (but may be heated to below 210° F.) into the formation containing the oil or oil yielding component.

The compounds useful in the instant invention are of formula I

$$[(R_f)_n(R')_p]_m Z \qquad (I)$$

wherein each $R_f$ is independently a perfluoro or omega-hydroperfluoro aliphatic group, each of which is independently uninterrupted or interrupted by a carbonyl, a carboxy, a carbonylamino, an oxygen, a sulfur, a sulfinyl, or a sulfonyl group; n is 1–3 and p is 0 or 1 provided that when p is 0, n is 1; m is 1–5000; each $R'$ is independently an organic linking group joining $R_f$ and Z and has a valency of $n+1$; and Z is a hydrocarbyl containing residue of valency m.

Preferably each $R_f$ has independently up to 20 carbon atoms, more preferably each $R_f$ has at least 4 carbon atoms, and more preferably 6–10 carbon atoms, most preferably 6 to 8 carbon atoms. Advantageously, $R_f$ has 6 carbon atoms. The suitable $R_f$ groups are inert, stable, oleophobic, and hydrophobic fluoroaliphatic groups. They are preferably selected from straight or branched perfluoroalkyl, perfluoroalkenyl, perfluoroalkoxy substituted perfluoroalkyl, and omega-hydro perfluoroalkyl. Most preferably, $R_f$ is a perfluoroalkyl group or a perfluoroalkoxy substituted perfluoroalkyl group, each $R_f$ most preferably having about 4 to about 20 carbon atoms.

n is preferably 1 or 2, most preferably 1.

The nature of the di to tetravalent organic linking group $R'$, when present, is not critical as long as it performs the essential function of bonding the fluoroaliphatic group, $R_f$, to the oleophilic organic radical Z.

In one sub-embodiment, $R'$ is an organic divalent linking group which covalently bonds the Rf group to the group Z.

Thus, $R'$ may, for example, be a divalent group, $R°$, selected from the following:
- —$C_1$—$C_y$ alkylene-,
- -phenylene-,
- —$C_1$—$C_y$ alkylene-$R_1$-$C_1$—$C_y$ alkylene-,
- —$C_1$—$C_y$ alkylene-$R_1$-,
- -$R_1$-$C_1$—$C_y$ alkylene-,
- -$R_1$-$C_1$—$C_y$ alkylene-$R_1'$-
- -$R_1$-,
- -$R_1$-phenylene-,
- -$R_1$-phenylene-$R_1'$-,
- -$R_1$-phenylene-$C_1$—$C_y$ alkylene-, or
- -phenylene-$R_1$-, wherein, in each case, y is 10 but preferably 8, and said alkylene and phenylene are independently unsubstituted or substituted by hydroxy, halo, nitro, carboxy, $C_1$-$C_6$ alkoxy, amino, $C_1$-$C_6$ alkanoyl, $C_1$-$C_6$ carbalkoxy, $C_1$-$C_6$ alkanoyloxy or $C_1$-$C_6$ alkanoylamino. The alkylene moiety may be straight or branched chain or contain cyclic alkylene moieites, such as cycloalkylene or norbornylene.

each $R_1$ and $R_1'$ independently represent:
—N($R_2$)—, —CO—, —N($R_2$)CO—, —CON($R_2$)—, —N($R_2$)COO—, —OCO—N($R_2$)—, —S—, —SO—, —SO$_2$—, —N($R_2$)SO$_2$—, —SO$_2$N($R_2$)—, —N($R_2$)CON($R_2$)—, —COO—, —OCO—, —OSO$_2$—, —OSO$_2$O —OCOO—,

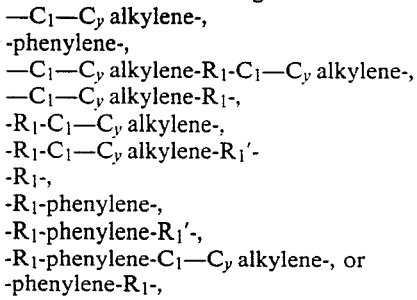

or —O—, where $R_2$ is hydrogen, $C_1$-$C_6$ alkyl or $C_1$-$C_6$ alkyl substituted by $C_1$-$C_6$ alkoxy, by halo, by hydroxy, by carboxy, by $C_1$-$C_6$ carbalkoxy, by $C_1$-$C_6$ alkanoyloxy or $C_1$-$C_6$ alkanoylamino. Also, if desired, the amino group —N($R_2$)—, above, may be in quaternized form, for example of the formula

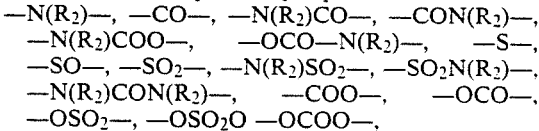

wherein a is 1, $R_3$ is hydrogen or $C_1$-$C_6$ alkyl which is unsubstituted or substituted by hydroxy, by $C_1$-$C_6$ alkoxy, by $C_1$-$C_6$ alkanoyloxy or by $C_1$-$C_6$ carbalkoxy and X is an anion, such as halo, sulfato, lower alkylsulfato such as methylsulfato, lower alkyl-sulfonyloxy such as ethyl sulfonyloxy, lower alkanoyloxy such as acetoxy or the like.

As an alternate sub-embodiment, $R'$, while being covalently bonded to both $R_f$ and Z may contain an ionic bridging group as an integral part of the chain linking $R_f$ to Z.

Thus, for example, $R'$ may be selected from the following:

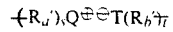

or

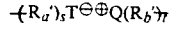

where $R_a'$ is $C_1$–$C_6$ alkylene-, -phenylene-, $C_1$–$C_6$alkylene-$R_1$-$C_1$—$C_y$ alkylene-, -$R_1$-$C_1$—$C_y$ alkylene-, -$R_1$-phenylene- or -$R_1$-phenylene-$C_1$—$C_y$ alkylene-;

$R_b'$ is —$C_1$—$C_y$ alkylene, -phenylene-, —$C_1$—$C_y$ alkylene-$R_1$-$C_1$—$C_y$ alkylene-, —$C_1$—$C_y$ alkylene-$R_1$-, -phenylene-$R_1$ or —$C_1$—$C_y$ alkylene-phenylene-$R_1$-; s and t are independently 0 or 1; y is 10 but preferably 8; T is an anionic group, $R_f$ is as defined above and Q is a cationic group and wherein said alkylene and phenylene of $R_a'$ and $R_b'$ are independently unsubstituted or substituted by hydroxy, halo, nitro, carboxy, $C_1$–$C_6$ alkoxy, amino, $C_1$–$C_6$ alkanoyl, $C_1$–$C_6$ carbalkoxy, $C_1$–$C_6$ alkanoyloxy or $C_1$–$C_6$ alkanoylamino.

Suitable anionic groups for T include carboxy, sulfoxy, sulfato, phosphono, and phenolic hydroxy. Suitable cationic groups for Q include amino and alkylated amino, such as those of the formula

where each $R_2$ and $R_3$ are as defined above.

A single molecule may have some, all, or none of the $R_f$ groups being linked to Z through an ionic bridge. When more than one ionic bridge is present in a molecule, they may be the same or different. However, in any one chain between any one $R_f$ and Z, only a single ionic bridge may be present or two such bridges may be present if a di terminal $T^-$ group links two $Q^+$ terminal groups or a diterminal $Q^+$ group links two $T^-$ terminal groups. In these di-ionic bridge chains, one of the mono ionic terminated groups is covalently bound to $R_f$ and the other (of the same charge) is covalently bound to Z. The di-ionic terminated group of opposite change links the two.

Where n is 2 and p is 1, R' is an organic trivalent group. Suitable such groups include those of the formula:

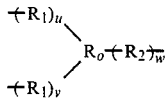

wherein $R_1$ and $R_2$ are defined above; u, v and w are independently 1 or 0 and $R_o$ is alkanetriyl, arenetriyl or aralkanetriyl of up to 18 carbon atoms which may be interrupted by one or more hetero atoms such as oxygen, sulfur or imino. Typical groups are analogous to those mentioned when n and p are 1 except that an additional valency is present, such as the following wherein the Z group attached thereto is also shown.

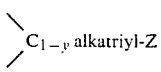

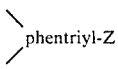

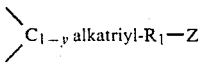

-continued

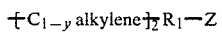

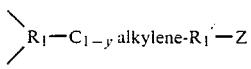

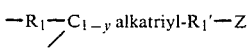

—$R_1$—$C_1$—$_y$ alkatriyl-$R_1'$—Z

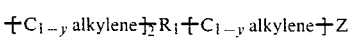

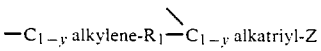

—$C_1$—$_y$ alkylene-$R_1$—$C_1$—$_y$ alkatriyl-Z

—$R_1$—Z

—$R_1$-phentriyl-Z

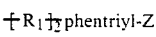

—$R_1$-phentriyl-$R_1'$—Z

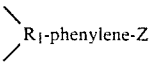

—$R_1$-phenylene-$R_1'$—Z

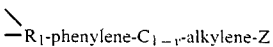

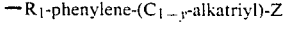

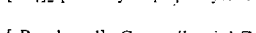

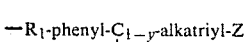

-continued

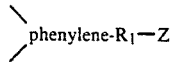

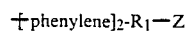

and

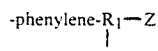

When n is 3 and p is 1, R' is a tetravalent group. Suitable groups are of the formula

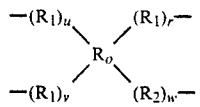

where R, u, v, and w are independently 0 or 1, $R_o$ is alkenetetryl, arenetetryl or aralkanetetryl of up to 18 carbon atoms which may be interrupted by one or more hetero atoms such as oxygen, sulfur, or imino, and $R_1$, and $R_2$ are as defined above.

Typical tetravalent R' groups, with the attached Z being shown, include:

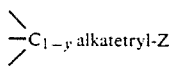

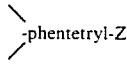

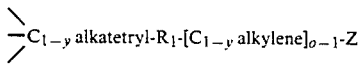

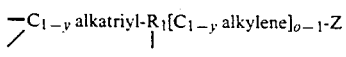

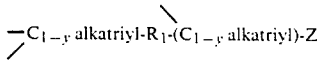

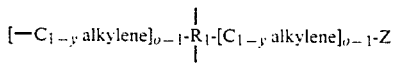

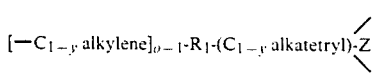

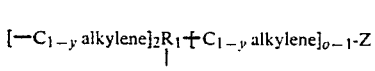

-continued

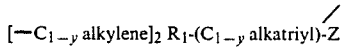

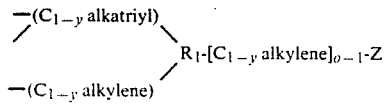

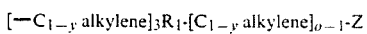

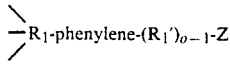

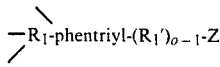

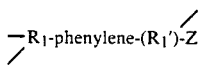

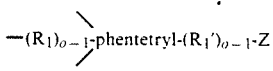

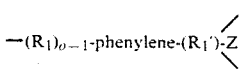

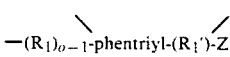

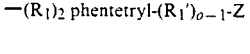

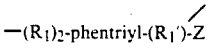

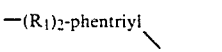

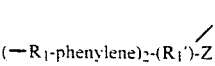

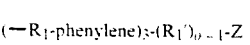

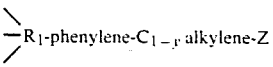

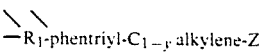

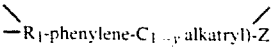

-continued

—$R_1$-phentetryl-$C_{1-y}$ alkylene-Z

—$R_1$-phenylene-$C_{1-y}$ alkatetryl-Z

—$R_1$-phentriyl-$C_{1-y}$ alkatriyl-Z (—$R_1$)$_2$-phentetryl-$C_{1-y}$ alkylene-Z (—$R_1$)$_2$-phentriyl-$C_{1-y}$ alkatriyl-Z

[(—$R_1$)$_2$-phentriyl]
—($R_1$)-phenylene $\diagdown C_{1-y}$ alkatriyl-Z (—$R_1$)$_3$-phentetryl-$C_{1-y}$ alkylene-Z (—$R_1$-phenylene)$_2$-($C_{1-y}$ alkatetryl)-Z and
(—$R_1$-phenylene)$_3$-$C_{1-y}$ alkatetryl-Z When R' is trivalent and requires either $R_1$ or $R_1'$ to be trivalent then R' must be a group having at least one $R_2$ group, and at least one of the $R_2$ groups is a group as previously defined, other than hydrogen, and having an additional available valence, or $R_2$ is a free valence.

When the $R_1$ or $R_1'$ groups are necessarily tetravalent, either two $R_2$ groups must be present meeting the above requirements or one $R_2$ group meets the above requirement but has 2 additional valencies over those groups mentioned when $R_1$ and $R_1'$ are divalent.

An alternate subembodiment of the trivalent and tetravalent R', while being covalently bound to each $R_f$ and Z, may contain an ionic bridging group as an integral part of the chain linking any particular $R_f$ to Z. Suitable such groups are of the formula —$Q^{\oplus\ominus}T$—
or
—$T^{\ominus}Q^{\oplus}$— as defined above and may interrupt or replace a portion of the R' linking group between any one $R_f$ and Z.

Preferably, when more than one $R_f$ to Z link contains an ionic bridge, the R' group traced from each such linked $R_f$ through the ionic bridge toward Z is the same.

The oleophilic organic radical Z can vary widely and is, in general, not critical.

For example, suitable oleophilic organic radicals, when m is 1 include, without limitation, conventional hydrophobic-oleophilic higher alkyl or alkenyl of 6–24 carbon atoms which are unsubstituted or substituted e.g. by chloro, bromo, alkoxy of up to 18 carbon atoms, nitro, alkanoyl of up to 18 carbon atoms, alkylmercapto of up to 18 carbon atoms, amino, $C_1$–$C_{18}$ alkylamino, or di-$C_1$–$C_{18}$ alkylamino; an aryl group, such as phenyl or naphthyl, the phenyl and naphthyl moiety of which is unsubstituted or substituted by alkyl of up to 20 carbon atoms, alkoxy of up to 20 carbon atoms, alkanoyl of up to 20 carbon atoms, alkanoyloxy of up to 20 carbon atoms or mono- or di-alkylamino of up to 20 carbon atoms; mono- or di-$C_6$–$C_{24}$-alkylamino-$C_2$–$C_7$-alkylene; alkoxyalkylene of 4–20 carbon atoms which is unsubstituted or substituted by one or two $C_6$–$C_{24}$ carbalkoxy or $C_6$–$C_{24}$ carbamoyl groups; poly-$C_6$–$C_{24}$alkoxy-higher alkyl or alkenyl of 6–24 carbon atoms; a heterocyclic group such as piperidino, piperazino, azepino, N-pyridinium, morpholino, benztriazolyl, triazinyl, pyrrolidino, furanyl, tetrahydrofuranyl and the like, which are unsubstituted or substituted e.g. by halo, alkoxy of up to 18 carbon atoms, nitro, alkanoyl of up to 18 carbon atoms, alkylmercapto of up to 18 carbon atoms, amino or alkylamino of up to 18 carbon atoms; poly-$C_2$–$C_3$alkoxy-phenyl, the phenyl group of which is unsubstituted or substituted by alkyl of up to 20 carbon atoms; a group of the formula -X-$(CH_2CH_2CH_2CH_2O)_gR''$ or of the formulae $$-X-(CH_2CHO)_b(CH_2CH_2O)_c(CH_2CHO)_dR''$$
$$\quad\quad\quad\;\; |\quad\quad\quad\quad\quad\quad\quad\quad\quad |$$
$$\quad\quad\quad\; CH_3\quad\quad\quad\quad\quad\quad\quad\; CH_3$$

$$-X-(CH_2CHO)_b(CH_2CHO)_c(CH_2CHO)_dR''$$
$$\quad\quad\quad\quad\quad\quad\quad\quad |$$
$$\quad\quad\quad\quad\quad\quad\quad CH_3$$

wherein X is oxygen or a bond when X is not bound to an oxygen, or X is a bond when it is bound to an oxygen, g is 2–80, b is 0–40 preferably 2–40, c is 0–80, preferably 2–80, d is 0–40, preferably 2–40, with b+c+d being at least 1, and R'' is H or $C_1$–$C_4$ alkyl; a group of the formula $$\quad A^{\ominus}\quad\quad\quad\quad\quad\quad\quad CH_3$$
$$\quad\oplus\quad\quad\quad\quad\quad\quad\quad\;\; |$$
$$-N-CH_2CH_2-N[(CH_2CHO)_e(CH_2CH_2O)_fH]_2$$
$$\; |$$
$$[(CH_2CHO)_e(CH_2CH_2O)_fH]_2$$
$$\; |$$
$$\; CH_3$$

wherein each e is 3–20, and each f is 3–20 and A is an anion; a group of the formula $$(CH_2CH_2O)_pN-R''$$
$$\quad\quad\quad\;\; |$$
$$\quad\quad\; (CH_2CH_2O)_qH$$

where p is 1–15 and q is 1–15 and R'' is alkyl of 6 to 22 carbon atoms or alkanoyl of 6 to 22 carbon atoms; or a group of the formula $$\quad\quad\quad\quad\quad\quad\quad\quad\quad\quad CH_3$$
$$\quad\quad\quad\quad\quad\quad\quad\quad\quad\quad |$$
$$CH_2-R^o-(CH_2CH_2O)_b(CH_2CH)_c(CH_2CH_2O)_dH$$
$$\;|$$
$$-CH-R^o-(CH_2CH_2O)_b(CH_2CH)_c(CH_2CH_2O)_dH$$
$$\quad\quad\quad\quad\quad\quad\quad\quad\quad\quad |$$
$$\quad\quad\quad\quad\quad\quad\quad\quad\quad\quad CH_3$$

where $R^o$, b, c and d are as defined above.

Also, where m is 2 or 3, Z represents an oleophilic organic divalent or trivalent radical. Suitable such radicals include those wherein Z is an oleophilic di- or trivalent aliphatic, carbocyclic, heterocyclic or aromatic group. For example, when m is 2, Z may represent an oleophilic polyalkyleneoxy containing group, the terminal members of which are covalently bonded to R'; an arylene group, such as phenylene or naphthalene which are unsubstituted or substituted, e.g. by alkyl up to 20 carbon atoms, alkoxy of up to 20 carbon atoms, alkanoyloxy of up to 20 carbon atoms, alkanoylamino of up to 20 carbon atoms, halo, amino or alkylamino of up to 20 carbon atoms, or the like; an alkylene or alkenylene group of up to 20 carbon atoms which is unsubstituted or substituted, e.g. by alkoxy of up to 20 carbon atoms, alkylamino of up to 20 carbon atoms, alkanoyl of up to 20 carbon atoms, alkanoylamino of up to 20 carbon atoms, or alkanoyloxy of up to 20 carbon atoms; a heterocyclic group, such as N,N'-piperazinylene, triazinylene, or the like.

An alternate group of compounds according to formula I are those wherein the $R_f$ group is pendant to an oleophilic polymer backbone.

Suitable oleophilic polymer backbones are those derived from condensation polymers and addition polymers.

For example, the group Z may contain condensation units of the formula: $(O-R_3-OCONH-D-NHCO)_m$ wherein $R_3$ is an aliphatic triradical or tetraradical of 2-50 carbon atoms which is covalently bonded to the $(R_f)_n(R')$ groups and is selected from the group consisting of branched or straight chain alkylene, alkylenethioalkylene, alkyleneoxyalkylene or alkyleneiminoalkylene; and D, together with the —NHCO groups to which it is attached, is the organic divalent radical resulting from a diisocyanate.

In a preferred subembodiment, D is alkylene of 2 to 16 carbon atoms; cycloaliphatic of 6 to 24 carbon atoms; phenylene that is unsubstituted or substituted by lower alkyl, lower alkoxy or chloro; diphenylene; phenyleneoxyphenyl, phenylene (lower alkylene) phenylene, or naphthylene, where the aromatic ring is otherwise unsubstituted or substituted by lower alkyl, lower alkoxy or chloro. In an alternate embodiment, up to about 85 percent of the $[(R_f)_n(R'_p)]_m R_3$ groups may be replaced by the biradical of a bis-(2-aminopropyl) ether of a polyethylene oxide; an aliphatic polyol of up to 18 carbon atoms; a di- or polyalkoxylated aliphatic or aromatic tertiary amine of up to 18 carbon atoms; a lower alkylene polyether; or a hydroxyterminated polyester having a hydroxyl number from 40 to 500.

Suitable preferred condensation polymers and their preparations are described, inter alia, in U.S. Pat. Nos. 3,935,277, 4,001,305, 4,046,944 and 4,054,592.

Suitable oleophilic polymer backbones derived from addition polymers comprising the group Z include those wherein up to about 5000 groups of the formula $(R_f)nR'_p$- are attached to an oleophilic hydrocarbyl containing polymeric backbone. Suitable polymers include those wherein the addition polymer contains up to about 5000 units of the formula

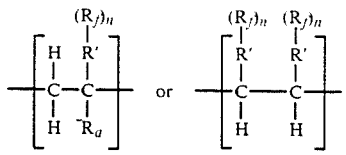

wherein $R_f$, n and R' are defined above, and $R_a$ is hydrogen or lower alkyl. Preferably $R_a$ is hydrogen or methyl.

In a preferred subembodiment of the compounds wherein Z is a polymer, R' is as previously defined except that it cannot have an —O—OC— group directly bound to Z with the carbonyl being attached to 2. In another subembodiment, R' is attached to Z via an R' terminal other than —OOC—, —COO—, or —OOCO—.

Such addition polymers are generally prepared, by methods known in the art, e.g. in U.S. Pat. Nos. 3,282,905, 3,491,169 and 4,060,681, by homo- or copolymerizing the corresponding monomer of the formula

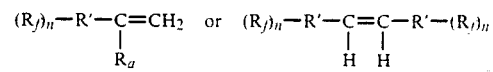

wherein $R_f$, n, R', and $R_a$ are defined above, optionally with polymerizable vinylic comonomers. Suitable conomomers include:

Ethylene and chloro, fluoro- and cyano- derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 12 or 18 carbon atoms in the ester groups such as n-propyl methacrylate, 2-methyl cyclohexyl methacrylate, methyl methacrylate, t-butyl methacrylate, n-butyl methacrylate, methyl acrylate, ethyl acrylate, propyl acrylate, butyl acrylate, 3-methyl-1-pentyl acrylate, octyl acrylate, tetradecyl acrylate, 5-butyl acrylate, 2-ethylhexyl acrylate, 2-methoxyethyl acrylate, and phenyl acrylate; dienes particularly 1,3-butadiene, isoprene, and chlorprene, 2-fluoro-butadiene, 1,1,3-trifluorobutadiene, 1,1,2,3-tetrafluorobutadiene, 1,1,2-trifluoro-3,4-dichlorobutadiene and tri- and pentafluorobutadiene butadiene and isoprene; nitrogen-vinyl monomers such as vinyl pyridine, N-vinylimides, amides, vinyl succinimide, vinyl pyrrolidone, N-vinyl carbazole and the like;

styrene and related monomers which copolymerize readily with the novel esters of this invention such as o-methylstyrene, p-methylstyrene, 3,4-dimethyl styrene, 2,4,6-trimethyl styrene, m-ethyl styrene, 2,5-diethyl styrene;

vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinyl caprylate, vinyl pelargonate, vinyl myristate, vinyl oleate and vinyl linoleate; vinyl esters of aromatic acids, such as vinyl benzoate;

alkyl vinylethers, such as methyl vinyl ether, isopropyl vinyl ether, isobutyl vinyl ether, 2-methoxy ethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl ether.

Propylene, butylene and isobutylene are preferred α-olefins useful as comonomers with the novel fluoro monomers of the present invention with straight and branched chain α-olefins useful with up to 18 carbon atoms in the side chain.

Suitable candidate compounds of the formula I containing one or more inert stable oleophobic and hydrophobic fluoroaliphatic groups, $R_f$, and an oleophilic hydrocarbyl containing residue, represent a well known class of compounds widely described in the literature.

For example, compounds of the formula I wherein n and m are 1 are described in U.S. Pat. Nos. 4,460,791;

4,310,698; 4,302,378; 3,575,899; 3,575,890; 4,202,706; 3,346,612; 3,575,899; 3,989,725; 4,243,658; 4,107,055; 3,993,744; 4,293,441; 4,107,055; 3,839,343; JP 77/88,592; Ger. Offen. 1,966,931; Ger. Offen. 2,245,722; JP 60/181,141; EP 140,525; JP 53/31582; CH 549,551; EP 74,057; FR 2,530,623; Ger. Offen. 2,357,780; JP 58/70806; Ger. Offen. 2,344,889; U.S. Pat. Nos. 3,575,890; 3,681,329; Ger. Offen. 2,559,189; U.S. Pat. Nos. 3,708,537; 3,838,165; 3,398,182 Ger. Offen. 2,016,423; Ger. Offen 2,753,095, Ger. Offen. 2,941,473; Ger. Offen. 3,233,830; JP 45/38,759; JP 51/144,730; Ger. Offen. 3,856,616; Ger. Offen. 2,744,044; JP 60/151,378; Ger. Offen. 1,956,198; and GB 1,106,641.

Compounds of the formula I wherein n is 2 or 3, or m is 2 to 4 are described, for example, in U.S. Pat. No. 4,219,625; Ger. Offen. 2,154,574; Ger. Offen. 2,628,776; Text. Res. J., 47 (8), 551-61 (1977); U.S. Pat. Nos. 4,268,598; 3,828,098; Ger. Offen. 1,938,544; Ger. Offen. 2,017,399; Ger. Offen. 2,628,776; Ger. Offen. 1,956,198; JP 47/16279; Ger. Offen. 1,938,545; Ger. Offen. 1,916,651; U.S. Pat. Nos. 3,492,374; 4,195,105; Ger. Offen, 2,009,781; U.S. Pat. No. 4,001,305; and GB 1,296,426.

Compounds where n is 1 to 3 and m is in excess of 4, up to for example about 500, are described, inter alia, in U.S. Pat. Nos. 3,935,277; 2,732,370; 2,828,025; 2,592,069; 2,436,144; 4,001,305; 4,046,944; 4,054,592; 4,557,837; 3,282,905, 3,491,169; and 4,060,681.

The compound of formula I is injected into the formation through the well bore. The injection may be optionally preceeded with solvent or hot water soaking in order to clean the perforations and the area immediately surrounding the well bore of sand and asphaltenes. If the formation has been heated by the foregoing step, the compound of formula I is pushed into the formation with water or solvent after having cooled to a temperature not in excess of 210° F., preferably not in excess of about 180° F., also preferably not in excess of about 150° F., and also preferably not in excess of 120° F. Preferably, water is employed to push the compound of formula I due to the low cost. When in contact with the formation, the compound of formula I lifts the oil from the sand and leaves the sand water wet. After a soaking period the oil is recovered through the chemical injection site. When oil production declines again (usually 2-10 weeks) the chemical treatment is repeated.

The solvent for the asphaltenes also simultaneously acts as carrier for the sand, which may clog the perforations in the injection bore. Typical such solvents include toluene, xylene, heavy aromatic naphtha and the like. Solubilizers for asphaltenes, other than solvents, include, without limitation, alkylbenzene sulfonic acid and derivatives thereof as may be known in the art, and may be used in conjunction with either the foregoing asphaltene solvents or the hot water. The hot water used to clean the bore acts as a carrier for both asphaltene and sand.

As can be well appreciated, the instant method can be used with formations which have never had their oil or oil yielding component content previously harvested, as well as those which have been already subjected to primary, and enhanced oil recovery processes.

The compound of formula I is generally introduced in either the pure state or in a solution or suspension in a suitable carrier. It may also be advantageously used in conjunction with hydrocarbon surfactants and scale and corrosion inhibitors. Typical hydrocarbon surfactants suitable for use in this context include, without limitation, the ethoxylated nonylphenols, reverse poloxamers, poloxamers, ethoxylated alcohols, polysorbate esters (typically available under the Tween ® name); and others as may be known to those of ordinary skill as useful in the oil recovery art. Suitable corrosion inhibitors useful in this regard, without limitation, include those disclosed in U.S. patent application Ser. Nos. 892,217, filed July 31, 1986 now abandoned; and Ser. No. 892,219, filed July 31, 1986 now U.S. Pat. Nos. 4,788,292, and 4,636,359, 4,642,221, 4,647,392, and 4,683,071 and others as known to those of ordinary skill in the corrosion inhibitor art, all of which are incorporated herein by reference. Scale inhibitors useful for the present purposes typically include, without limitation, amino alkanol phosphonates, most notably the amino propanol phosphonates, etc. as are well known in the scale inhibiting art.

Preferably, the carrier is a solvent for the compound, preferably selected from the group of aromatic solvents such as toluene, xylene and the like, or from petroleum derived solvents such as naphtha. The compound of formula I may also be advantageously used in the form of an emulsion. The compound of formula I, when present in a carrier therefor, is preferably present in a concentration of at least 1%, preferably about 1 to about 80% more preferably 5-50%, most preferably 5-15% by weight. The compound of formula I is typically used in an amount of 5 to 5,000 parts per million based on the oil to be recovered.

Having fully described the invention, the following examples are provided to exemplify particular embodiments, but do not limit the invention.

EXAMPLE 1

An oil well in the Kern field in Bakersfield, California was producing two barrels of 12.7° API oil and 196 barrels of water/day. The depth was 1,000 ft. and the bottom hole temperature 130° F. Prior to injection of the chemical into the formation the well bore was cleaned by soaking with 400 kg of toluene containing 7% dodecyl benzene sulfonic acid. Twenty barrels of 180° F. water were then injected into the well bore, followed by addition of 200 kg of a formulation containing:

28% water
15% methanol

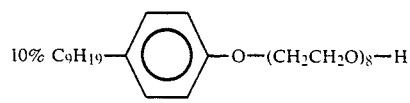

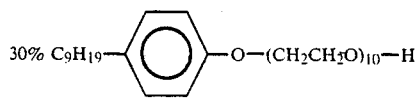

-continued

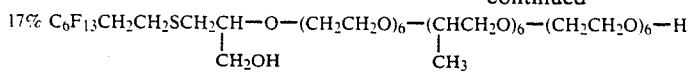

An additional 100 barrels of 180° F. water were added through the well bore in order to push the chemical into the formation. The well was shut down for twelve hours after which production was resumed. The production profile of the well after treatment is summarized below.

| Day | Barrels of oil/day | Barrels of water/day |
|---|---|---|
| 1 | 20 | 144 |
| 2 | 36 | 144 |
| 3 | 6 | 170 |
| 4 | 7 | 168 |
| 5 | 6 | 170 |
| 6 | 6 | 170 |
| 7 | 8 | 169 |
| 8 | 10.8 | 161.2 |
| 9 | 10.8 | 161.2 |
| 10 | 10.8 | 161.2 |
| 11 | 8.6 | 162.4 |
| 12 | 6.9 | 164.1 |
| 13 | 6.0 | 166.0 |
| Total 13 | 142.9 | 2,111.1 |

The total production for the thirteenth day period before chemical treatment was 26 barrels of oil and 2,548 barrels of water. The chemical treatment enhanced oil production by 550%.

In another well in the same field previously producing one barrel of oil and 293 barrels of water per day, with a 1,000 ft. depth and a bottomhole temperature of 90° F., cleaned and treated in the same manner as above, oil production increased according to the profile shown below.

| Day | Barrels of oil/day | Barrels of water/day |
|---|---|---|
| 1 | 4.5-5 | 289 |
| 2 | 4.5-5 | 289 |
| 3 | 4.5-5 | 289 |
| 4 | 4.5-5 | 289 |
| 5 | 4.5-5 | 289 |
| 6 | 4.5-5 | 289 |
| 7 | 4.5-5 | 289 |
| 8 | 4.5-5 | 289 |
| 9 | 4.5-5 | 289 |
| 10 | 6.9 | 287 |
| 11 | 6.9 | 287 |
| 12 | 6.9 | 287 |
| 13 | 8.0 | 286 |
| 14 | 9.0 | 285 |

EXAMPLES 2–18

Based on the use of the previously described evaluation methods the following fluorochemicals exhibit usefulness as injection additives.

| Example # | Reference and Fluorochemical |
|---|---|
| 2 | Ger. Offen. DE 2245722<br>$F_3C(CF_2)_7(CH_2)_2S(CH_2)_{11}$ |
| 3 | Jpn. Kokai Tokkyo Kono JP 60/18<br>$CH_3(CH_2)_{16}C(O)O(CH_2)_2(CF_2)_7CF_3$ |
| 4 | Eur. Pat. Appl. EP 140525<br>$CH_3(CH_2)_3CH=CH)_3(CH_2)_7C(O)O(CH_2)_2N(CH_3)SO_2(CF_2)_7CF_3$ |

EXAMPLES 2–18 (cont'd)

| Example # | Reference and Fluorochemical |
|---|---|
| 5 | U.S. Pat. No. 3,988,725<br>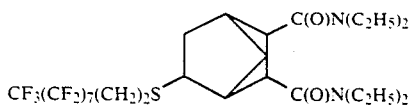 |
| 6 | Ger. Offen. DE 2357780<br>$CF_3(CF_2)_7CH(OH)CH_2NH(CH_2)_7CH_3$ |
| 7 | U.S. Pat. No. 4,202,706<br>$CF_3(CF_2)_7SO_2N(C_2H_5)(CH_2)_{11}OH$ |
| 8 | Jpn. Kokai Tokkyo Koho JP 60/15137<br>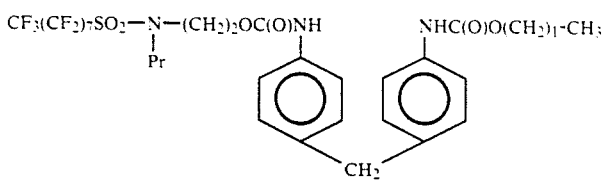 |
| 9 | Ger. Offen. DE 3,306,593<br>Poly[oxy(methyl-1,2-ethanediyl)],<br>alpha-(3,3,4,4,5,5,6,6,7,7,8,8,9,9,10,10,10-hepta-<br>decafluorodecyl)-omega-hydroxy-(9CI) |

EXAMPLES 2–18 (cont'd)

| Example # | Reference and Fluorochemical |
|---|---|
| 10 | Fr. FR 2,117,416<br>Poly[oxy(methyl-1,2-ethanediyl)],<br>alpha-[2-[ethyl[(heptadecafluorooctyl)sulfonyl]-<br>amino]methylethyl]-omega-hydroxy-(9CI) |
| 11 | J. Econ. Entomol., 78(6), 1190–7<br><br>$H{+}O(CH_2{\rightarrow})_{38}O(CH_2)_2NSO_2(CF_2)_7CF_3$<br>$\quad\quad\quad\quad\quad\quad\quad\quad\quad\quad\quad\mid$<br>$\quad\quad\quad\quad\quad\quad\quad\quad\quad\quad(CH_2)_3CH_3$ |
| 12 | Eur. Pat. Appl. EP 144,844<br><br>$\phantom{O_3S}\quad CH_3\quad\quad CH_3\quad\quad CH_3$<br>$\phantom{O_3S}\quad \mid\oplus\quad\quad\mid\quad\quad\quad\mid$<br>$O_3S(CH_2)_2N{+}CH_2CHO{]}_5CH_2CH{-}NH(CH_2)_2(CH_2)_7CF_3$<br>$\phantom{O_3S(CH_2)_2N}\mid$<br>$\phantom{O_3S(CH_2)_2}CH_3$ |
| 13 | Japan Kokai JP 53/31582<br><br>$\phantom{CH_3(CH_2)_{16}C(O)(OCH_2CH_2)_5NSO_2}CH_3$<br>$\phantom{CH_3(CH_2)_{16}C(O)(OCH_2CH_2)_5NSO_2}\mid$<br>$CH_3(CH_2)_{16}C(O)(OCH_2CH_2)_5NSO_2(CF_2)_7CF_3$ |
| 14 | Jpn. Kokai Tokkyo Koho JP 58/70806<br>$CH_3(CH_2)_{17}CONH(CH_2)_6NHSO_2(CF_2)_7CF_3$ |

EXAMPLES 2–18 (cont'd)

| Example # | Reference and Fluorochemical |
|---|---|
| 15 |  phenyl-NHSO$_2$(CF$_2$)$_7$CF$_3$ |
| 16 | U.S. Pat. No. 3,575,899<br><br>phenyl with substituents:<br>—NHC(O)O(CH$_2$)$_2$N(C$_2$H$_5$)SO$_2$(CF$_2$)$_7$CF$_3$<br>—NHC(O)O(CH$_2$)$_{17}$CH$_3$ |
| 17 | Japan Kokai JP 51/144730<br><br>phenyl with substituents:<br>—NHC(O)O(CH$_2$)$_3$O(CH$_2$)$_2$(CF$_2$)$_7$CF$_3$<br>—CH$_3$<br>—NHC(O)[OCH$_2$CH$_2$]$_7$OH |
| 18 | Japan Kokai JP 51/151126<br>Poly[oxy(methyl-1,2-ethanediyl)],<br>omega-[(3,3,4,4,5,5,6,6,7,7,8,8,9,9,10,10-hepta-<br>decafluorodecyl)oxy]-omega'-hydroxy-alpha,alpha'-<br>[(methylphenylene)bis(iminocarbonyl)]bis-(9CI) |

What is claimed is:

1. A method of cyclic oil production consisting of
   (a) cleaning the injection bore of asphaltenes, sand or both by injecting into said bore (i) a solubilizer or solvent for said asphaltenes and a carrier for said sand or (ii) a hot aqueous solution as a carrier for said sand and said asphaltenes, or (iii) both (i) and (ii), and if said formation is heated to above 210° F., the formation is permitted to cool to not in excess of 210° F.;
   (b) contacting a composition consisting essentially of an effective amount of a compound selected from fluorochemicals of formula I $$[(R_f)_n(R')_p]_m Z \qquad (I)$$

wherein
   $R_f$ is an inert, stable oleophobic and hydrophobic fluoroaliphatic group having up to about 20 carbon atoms;
   n is an integer of 1 to 3;
   R' is a direct bond or an organic group having a valency of n+1 and is covalently bonded to both $R_f$ and Z;
   m is an integer of from 1 to about 5000;
   Z is a hydrocarbyl containing residue of valency m; or mixtures thereof; and
   p is 0 or 1 provided that when p is 0, n is 1, and an effective amount for dispersing crude oil in water of at least one hydrocarbon surfactant in solution or suspension with a deposit containing crude oil by injection thereof through an injection bore thereby lifting oil and leaving the sand water wet and otherwise not altering the formation; and
   (c) extracting said oil from said deposit via said injection bore; while maintaining the temperature of said formation at from ambient temperature up to and including 210° F.

2. A method of cyclic oil production consisting of:
   (a) contacting a composition consisting essentially of an effective amount of a compound selected from fluorochemicals of formula I $$[(R_f)_n(R')_p]_m Z \qquad (I)$$

wherein
   $R_f$ is an inert, stable oleophobic and hydrophobic fluoroaliphatic group having up to about 20 carbon atoms;
   n is an integer of 1 to 3;
   R' is a direct bond or an organic group having a valency of n+1 and is covalently bonded to both $R_f$ and Z;
   m is an integer of from 1 to about 5000;
   Z is a hydrocarbyl containing residue of valency m; or mixtures thereof; and
   p is 0 or 1 provided that when p is 0, n is 1; an effective amount for dispersing crude oil in water of at least one hydrocarbon surfactant in aqueous solution or suspension, and a corrosion inhibitor, scale inhibitor or a mixture thereof, with a deposit containing crude oil by injection thereof through an injection bore thereby lifting oil and leaving the sand water wet and otherwise not altering the formation; and
   (b) extracting said oil from said deposit via said injection bore;
   while maintaining the temperature of said formation at from ambient temperature up to and including 210° F.

3. A method of cyclic oil production consisting of:

(a) contacting a composition consisting essentially of an effective amount of a compound selected from fluorochemicals of formula I $$[(R_f)_n(R')_p]_m Z \qquad (I)$$

wherein
- $R_f$ is an inert, stable oleophobic and hydrophobic fluoroaliphatic group having up to about 20 carbon atoms;
- n is an integer of 1 to 3;
- R' is a direct bond or an organic group having a valency of n+1 and is covalently bonded to both $R_f$ and Z;
- m is an integer of from 1 to about 5000;
- z is a hydrocarbyl containing residue of valency m; or mixtures thereof; and
- p is 0 or 1 provided that when p is 0, n is 1; and an effective amount for dispersing crude oil in water of at least one hydrocarbon surfactant in aqueous solution or suspension with a deposit containing crude oil by injection thereof through an injection bore thereby lifting oil and leaving the sand water wet and otherwise not altering the formation; and (b) extracting said oil from said deposit via said injection bore; while maintaining the temperature of said formation at from ambient temperature up to and including 210° F.

4. The method of claim 3 wherein $R_f$ has 4–20 carbon atoms.

5. The method of claim 3 wherein each $R_f$ is independently a straight or branched chain selected from perfluoroalkyl, perfluoroalkoxy-perfluoroalkyl, omega-hydroperfluoroalkyl, or perfluoroalkenyl, each $R_f$ independently having 4 to 20 carbon atoms.

6. The method of claim 3 wherein each $R_f$ is the same.

7. The method of claim 5 wherein $R_f$ is perfluoroalkyl having 4–20 carbon atoms.

8. The method of claim 5 wherein $R_f$ is $C_6$–$C_{10}$ perfluoroalkyl.

9. The method of claim 5 wherein $R_f$ is $C_6$–$C_8$ perfluoroalkyl.

10. The method of claim 5 wherein $R_f$ is $C_6$ perfluoroalkyl.

11. The method of claim 3 wherein n is 1, p is 1, and R' is a divalent organic linking group covalently bound to $R_f$ and to Z and selected from the group consisting of
$-(C_{1-10}\text{alkylene})_{alpha}$-$R_1$-$(C_{1-10}\text{alkylene})_\beta$-
$-(R_1)_{alpha}$-$[C_{1-10}\text{alkylene}]$-$(R_1')_\beta$-,
$-(R_1)_{alpha}$-phenylene-$(R_1')_\beta$-, and
$-R_1$-phenylene-$C_{1-10}$ alkylene-,
in each case being bound to Z through the bond shown on the right of the above formulae,
wherein alpha and β are independently 0 or 1, said R' $C_{1-10}$ alkylene and R' phenylene being independently unsubstituted or substituted by hydroxy, halo, nitro, carboxy, $C_{1-6}$alkoxy, amino, $C_{1-6}$alkanoyl, $C_{1-6}$carbalkoxy, $C_{1-6}$alkanoyloxy, or $C_{1-6}$alkanoylamino, each $R_1$ and $R_1'$ being independently selected from —L—, —L-CO—, —COL—, —L-COO—, —OOCL—, —LSO$_2$—, —SO$_2$L—, —LCON(R$_2$)—, —OP(O)(OR$_2$)—, —P(O)(OR$_2$)O—, —P(O)(OR$_2$)—, —CO—, —S—, —SO—, —SO$_2$—, —COO—, —OOC—, —OSO$_2$—, —OSO$_2$O—, —OCOO—, and —O—; in which L is —N(R$_2$)— or —N$^+$(R$_2$)(R$_3$)—; each R$_2$ being independently selected from H, and $C_{1-6}$alkyl which is unsubstituted or substituted by $C_{1-6}$alkoxy, by halo, by hydroxy, by carboxy, by $C_{1-6}$carbalkoxy, by $C_{1-6}$alkanoyloxy, or by $C_{1-6}$alkanoylamino; and R$_3$ is H or $C_{1-6}$alkyl which is unsubstituted or substituted by OH, by $C_{1-6}$alkoxy, by $C_{1-6}$alkanoyloxy, or by $C_{1-6}$carbalkoxy; and when L is —N$^\oplus$(R$_2$)(R$_3$)—, a counterion X$^\ominus$ is present; or said R' is interrupted or has a portion thereof replaced by an ionic bridge pair group -Q$^\oplus\ominus$T- or -T$^\ominus\oplus$Q wherein T$^\oplus$ is an anionic group selected from carboxy, sulfoxy, sulfato, phosphono, and phenolic hydroxy and Q$^\ominus$ is a cationic group selected from quaternary ammonium.

12. The method of claim 3 wherein n is 2, p is 1, and R' is a trivalent organic linking group covalently bound to two $R_f$ groups and to Z and selected from

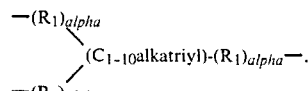

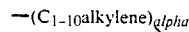<br/>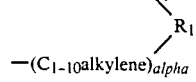

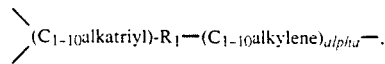

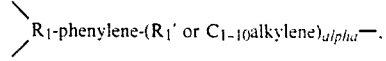

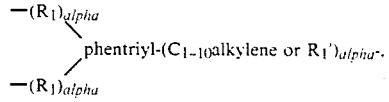

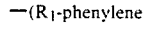<br/>

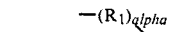<br/>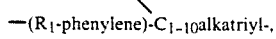

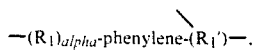

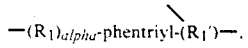

in each case being bound to Z through the bond shown on the right hand side of the above formulae,
wherein each alpha is individually 0 or 1 β is 0 or 1, and gamma is 0 or 1 but when β is 1, alpha is 0, and gamma is 1;

wherein each R' $C_{1-10}$alkylene, R' $C_{1-10}$alkatriyl, R' phenylene, and R' phentriyl is independently unsubstituted or substituted by hydroxy, halo, nitro, carboxy, $C_{1-6}$alkoxy, amino, $C_{1-6}$alkanoyl, $C_{1-6}$carbalkoxy, $C_{1-6}$alkanoyloxy or $C_{1-6}$alkanoylamino;

each $R_1$ and $R_1'$ being independently selected from —L—, —L-CO—, —C(O)L—, —LCOO—, —OOCL—, —LSO$_2$SO$_2$L—, —L-C(O)L—, —OP(O)—(OR$_2$)—, —P(O)(OR$_2$)O—, —P(O)-

(OR$_2$)—, —CO—, —S—, —SO—, —SO$_2$—, —COO—, —OOC—, —OSO$_2$—, —OSO$_2$O—, —O—COO—, and —O—;

in which each L is independently —NR$_2$— or —N$^+$(R$_2$)(R$_3$)— each R$_2$ being independently selected from a free valence, H, and C$_{1-6}$alkyl which is unsubstituted or substituted by C$_{1-6}$alkoxy, by halo, by hydroxy by carboxy, or by C$_{1-6}$alkanoylamino; or R$_2$ is a radical of a C$_{1-6}$alkyl group which is unsubstituted or substituted by C$_{1-6}$alkoxy by halo, by hydroxy, by crboxy, or by C$_{1-6}$ alkanoylamino, and has an additional free valence; and R$_3$ is a valence, H, or C$_{1-6}$alkyl which is unsubstituted or substituted by OH, by C$_{1-6}$alkoxy, by C$_{1-6}$alkanoyloxy, or by C$_{1-6}$carbalkoxy, or R$_3$ is C$_{1-6}$alkyl which is unsubstituted or substituted by hydroxy, by C$_{1-6}$ alkoxy, by C$_{1-6}$ alkanoyloxy, or by C$_{1-6}$carbalkoxy having an additional free valence;

and when L is —$^\oplus$N(R$_2$) (R$_3$)—, a counterion X$^\ominus$ is present;

or said R' contains as an integral part of the chain linking R$_f$ to Z an ionic bridge pair group -Q$^\oplus$$^\ominus$T- or -T$^\ominus$$^\oplus$Q- wherein T$^\ominus$ is an anionic group selected from carboxy, sulfoxy, sulfato, phosphono, and phenolic hydroxy, and Q$^\oplus$ is a cationic group selected from quaternary ammonium.

13. The method of claim 3 wherein n is 3, p is 1, and R' is a tetravalent organic linking group covalently bound to 3 R$_f$ groups and to Z and is selected from

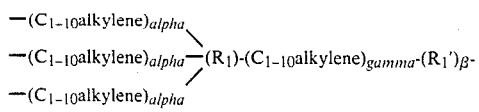
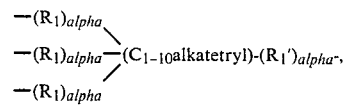
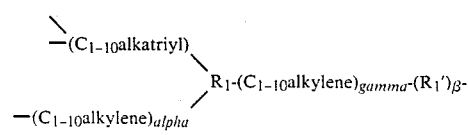
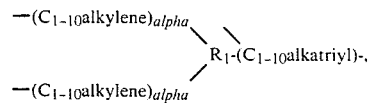
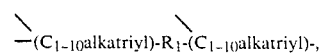
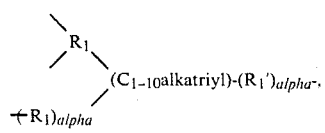
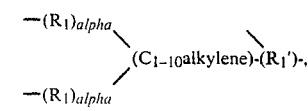

-continued

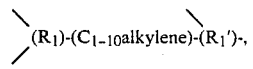
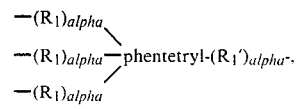
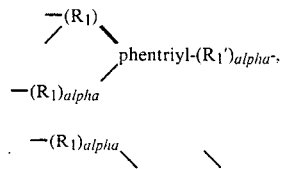
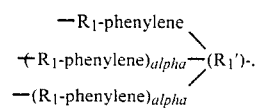
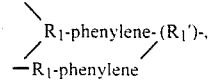

in each case being bound to Z through the bond shown on the right side of the above formulae, wherein each alpha, β, and is 0 or 1, but when β is 1, gamma is 1, and alpha is 0; wherein each R' C$_{1-10}$alkylene, R' C$_{1-10}$alkatriyl, R' C$_{1-10}$alkatetryl, R' phenylene, R' phentriyl, and R' phentetryl is independently unsubstituted or substituted by hydroxy, halo, nitro, carboxy, C$_{1-6}$alkoxy, amino, C$_{1-6}$alkanoyl, C$_{1-6}$carbalkoxy, C$_{1-6}$alkanoyloxy, or C$_{1-6}$alkanoylamino;

each R$_1$ and R$_1$' being independently selected from —L—, —L-CO—, —C(O)L—, —LCOO—, —OOCL—, —LSO$_2$—, —SO$_2$-L—, —LC(O)L—, —OP(O)(OR$_2$)—, —P(O)(OR$_2$)O—, —P(O)(OR$_2$)—, —CO—, —S—, —SO—, —SO$_2$—, —COO—, —OOC—, —OSO$_2$—, —OSO$_2$O—, —OC(O)O—, and —O—;

in which each L is independently —NR$_2$— or N$^+$R$_2$R$_3$-;

each R$_2$ being independently selected from (a) a free valence, (b) H, and (c) C$_{1-6}$alkyl which is unsubstituted or substituted by C$_{1-6}$alkoxy, by halo, by hydroxy, by carboxy, by C$_{1-6}$carbalkoxy, by C$_{1-6}$alkanoyloxy, or by C$_{1-6}$alkanoylamino each of said R$_2$ unsubstituted and substituted C$_{1-6}$alkyl groups having 0-2 additional free valencies;

and R$_3$ is (a) a free valence, (b) H, or (c) C$_{1-6}$alkyl which is unsubstituted or substituted by OH, by C$_{1-6}$alkoxy, by C$_{1-6}$alkanoyloxy, or by C$_{1-6}$alkoxy, by C$_{1-6}$alkanoyloxy, or by C$_{1-6}$carbalkoxy, each of said R$_3$ unsubstituted or substituted C$_{1-6}$alkyl groups having 0-2 additional free valencies; and when L is —$^+$NR$_2$R$_3$—, a counterion is present;

or said R' contains as an integral part of the chain linking R$_f$ to Z an ionic bridge pair group -Q$^\oplus$$^\ominus$T or -T$^\ominus$$^\oplus$Q-wherein T$^\ominus$ is an anionic group selected from carboxy, sulfoxy, sulfato, phosphono, and phenolic hydroxy, and $Q^\oplus$ is a cationic group selected from quaternary ammonium.

14. The method of claim 3 wherein -R'-Z does not terminate in —OOC-Z.

15. The method of claim 3 wherein p is o.

16. The method of claim 3 wherein m is 1 and Z is selected from (a) $C_{6-24}$alkyl and $C_{6-24}$alkenyl, each of which are unsubstituted or substituted by Cl, Br, $C_{1-18}$alkoxy, nitro, alkanoyl of up to 18 carbon atoms, alkylmercapto of up to 18 carbon atoms, amino, $C_1$-$C_{18}$alkylamino, or di-$C_{1-18}$alkylamino;

(b) phenyl or naphthyl, each of which is unsubstituted or substituted by $C_{1-20}$alkyl, $C_{1-20}$alkoxy, alkanoyl of up to 20 carbon atoms, alkanoyloxy of up to 20 carbon atoms, mono- or di-alkylamino of up to 20 carbon atoms;

(c) mono- or di- $C_{6-24}$alkylamino-$C_{2-7}$alkylene;

(d) alkoxyalkylene of 4–20 carbon atoms which is unsubstituted or substituted by one or two $C_{6-24}$carbalkoxy or $C_{6-24}$carbamoyl groups;

(e) poly$C_{6-24}$alkoxy-$C_{6-24}$alkyl or poly $C_{6-24}$alkoxy-$C_{6-24}$-alkenyl;

(f) a heterocyclic group selected from piperidino, piperazino, azepino, N-pyridium, morpholino, benztriazolyl, triazinyl, pyrrolidino, furanyl and tetrahydrofuranyl, each of which is unsubstituted or substituted by halo, $C_{1-18}$alkoxy, nitro, alkanoyl of up to 18 carbon atoms, $C_{1-18}$alkylmercapto, amino, or $C_{1-18}$alkylamino;

(g) poly-$C_{2-3}$alkoxy-phenyl, the phenyl group of which is unsubstituted or substituted by $C_{1-20}$alkyl;

(h) a group of the formula

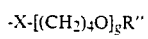

or

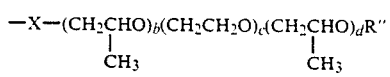

or

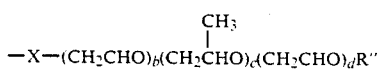

wherein X is oxygen or a bond when X is not bound to an oxygen atom, or X is a bond when it is bound to an oxygen atom, g is 2–80, b is 0–40, c is 0–80, and d is 0–40, while b+c+d is at least one; and R" is H or $C_{1-4}$alkyl;

(i) a group of the formula $A^\ominus$

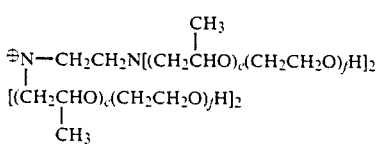

wherein each e is 3–20, and each f is 3–20 and A is an anion;

(j) a group of the formula

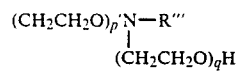

wherein p' is 1–15, q is 1–15 and R'" is $C_{6-22}$ alkyl or $C_{6-22}$alkanoyl; and (k) a group of the formulae

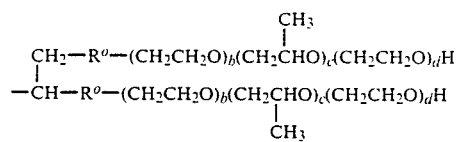

or

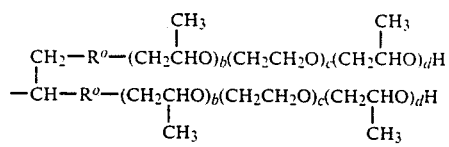

wherein b, c, and d are defined above and $R^o$ is alkylene, arylene, or arylene-alkylene, each having up to 18 carbon atoms and which is uninterrupted or interrupted by a hetero atom selected from —O—, —S—, or —NH—.

17. The method of claim 3 wherein m is 2 and Z is a polyalkyleneoxy containing group, the terminal members of which are covalently bound to R' when p is 1 and to $R_f$ when p is zero; or Z is phenylene or naphthylene each of which is unsubstituted or substituted by $C_{1-20}$alkyl, by $C_{1-20}$alkoxy, by alkanoyloxy of up to 20 carbon atoms, by alkanoylamino of up to 20 carbon atoms, by halo, by amino, or by $C_{1-20}$alkylamino; or Z is an alkylene or alkenylene of up to 20 carbon atoms, each of which is unsubstituted or substituted by $C_{1-20}$alkoxy, by $C_{1-20}$alkylamino, by alkanoyl of up to 20 carbon atoms, by alkanoylamino of up to 20 carbon atoms, or by alkanoyloxy of up to 20 carbon atoms; or Z is N,N' piperazinylene or triazinylene.

18. The method of claim 3 wherein the compound of formula I is a condensation polymer or copolymer having a repeating unit of the formulae

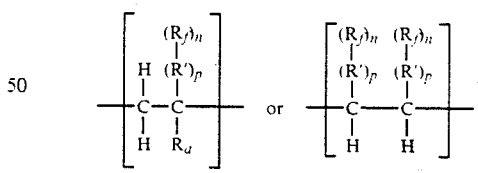

wherein R', $R_f$, n, and p are defined as in claim 1, and $R_a$ is H or lower alkyl, such that up to 5000 $R_f$ groups are present.

19. The method of claim 3 wherein the portion of R' which binds to Z is other then B-OOC—, where B signifies the balance of R' exclusive of the —OOC- group.

20. The method of claim 3 wherein said contacting and extracting steps are carried out with the deposit being maintained at a temperature of not greater than about 180° F.

21. The method of claim 20 wherein the deposit is maintained at a temperature of not greater than about 150° F. during said contacting and extracting steps.

22. The method of claim 20 wherein the deposit is maintained at a temperature of not greater than about 120° F. during said contacting and extracting steps.

23. The method of claim 3 wherein said hydrocarbon surfactant is selected from ethoxylated nonyl phenols, poloxamers, reverse poloxamers, ethoxylated alcohols and polysorbate esters.

24. The method of claim 3 wherein said hydrocarbon surfactant is selected from ethoxylated p-nonyl phenols having 2-20 ethyleneoxy units per molecule.

25. The method of claim 24 wherein said ethoxylated p-nonyl phenol has an average of 9 ethoxy units and constitutes about 20-about 80% of said formulation.

26. The method of claim 25 wherein said ethoxylated p-nonyl phenol constitutes about 40% of said formulation.

27. The method of claim 25 wherein said formulation further comprises at least one solvent for both of said compound of formula I and said hydrocarbon surfactant.

28. The method of claim 25 wherein said solvent is selected from water, lower alkanol, and mixtures thereof.

29. The method of claim 25 wherein said formulation comprises:
- 20-40% water
- 10-20% methanol
- 20-60% ethoxylated p-nonyl phenol having an average of 9 ethyleneoxy units
- 10-50% a compound of formula I.

30. The method of claim 3 wherein said crude oil is a heavy asphaltenic crude oil having a viscosity at about 60° F. of at least 750 centipoise.

31. The method of claim 30 wherein said crude oil viscosity is from 1,000 to 1,000,000 centipoise.

* * * * *